United States Patent [19]

Bisdikian et al.

[11] Patent Number: 5,349,582
[45] Date of Patent: Sep. 20, 1994

[54] SCHEME FOR SOURCE ASSISTED PARTIAL DESTINATION RELEASE OF SLOTS IN SLOTTED NETWORKS

[75] Inventors: Chatschik Bisdikian, Mount Kisco; Ahmed N. Tantawy, Yorktown Heights, both of N.Y.

[73] Assignee: International Business Machines Corporation, Armonk, N.Y.

[21] Appl. No.: 971,373

[22] Filed: Nov. 4, 1992

[51] Int. Cl.$^5$ .............................. H04J 3/02; H04J 3/24
[52] U.S. Cl. ................... 370/85.1; 370/85.11; 370/95.1; 370/110.1
[58] Field of Search ................. 370/85.1, 85.2, 85.9, 370/85.4, 85.6, 85.7, 85.12, 85.11, 94.1, 95.1; 340/825.5, 825.51, 110.1

[56] References Cited

U.S. PATENT DOCUMENTS

| | | | |
|---|---|---|---|
| 4,763,321 | 8/1988 | Calvignac et al. | 370/94.1 |
| 4,815,071 | 3/1989 | Shimizu | 370/94.1 |
| 5,001,707 | 3/1991 | Kositpaiboon et al. | 370/94.1 |
| 5,111,456 | 5/1992 | Limb | 370/85.1 |
| 5,115,430 | 5/1992 | Hahne et al. | 370/85.6 |
| 5,121,388 | 6/1992 | Perdikaris et al. | 370/85.4 |
| 5,163,047 | 11/1992 | Perdikaris et al. | 370/85.4 |

Primary Examiner—Douglas W. Olms
Assistant Examiner—Chau T. Nguyen
Attorney, Agent, or Firm—Scully, Scott Murphy & Presser

[57] ABSTRACT

A slotted communications network by using a source node to indicate in every slot whether that slot is going to the same destination node as the immediately preceding slot. This is done by setting a flag, referred to as the continuation flag, in the header of each slot that is going to the same destination node as the immediately preceding slot; and preferably, this continuation flag is the first symbol in the header. Each node needs only to examine the continuation flag of the slot that immediately follows a slot that node has received. If the continuation flag is set in that following slot, then the destination node resets the busy indicator of that following slot to allow its reuse by other nodes, including the destination node itself if the access protocol allows that.

13 Claims, 5 Drawing Sheets

STATES:
N NORMAL
PC POSSIBLE CONTINUATION
C CONTINUATION

TRANSITIONS:
T1 USED A SLOT (AS PER PROTOCOL)
T2 COULD NOT USE A PASSING SLOT

ACTIONS:
A1 SET "C" FLAG

STATES:
N NORMAL
CC CHECK CONTINUATION
E ERROR

TRANSITIONS:
T1 WAS DESTINATION OF (LAST) SLOT (C=OFF)
T2 WAS NOT DESTINATION OF (LAST) SLOT
T3 WAS DESTINATION OF (LAST) SLOT (C=ON)

ACTIONS:
A1 RELEASE SLOT AND CLEAR "C" FLAG

SINGLE BUS MEAN MESSAGE DELAY OF EACH NODE IN A SLOTTED BUS NETWORK FOR 0.95SEG/SLOT OFFERED LOAD

DUAL BUS MEAN MESSAGE DELAY OF EACH NODE IN A SLOTTED BUS NETWORK FOR 1.90SEG/SLOT OFFERED LOAD

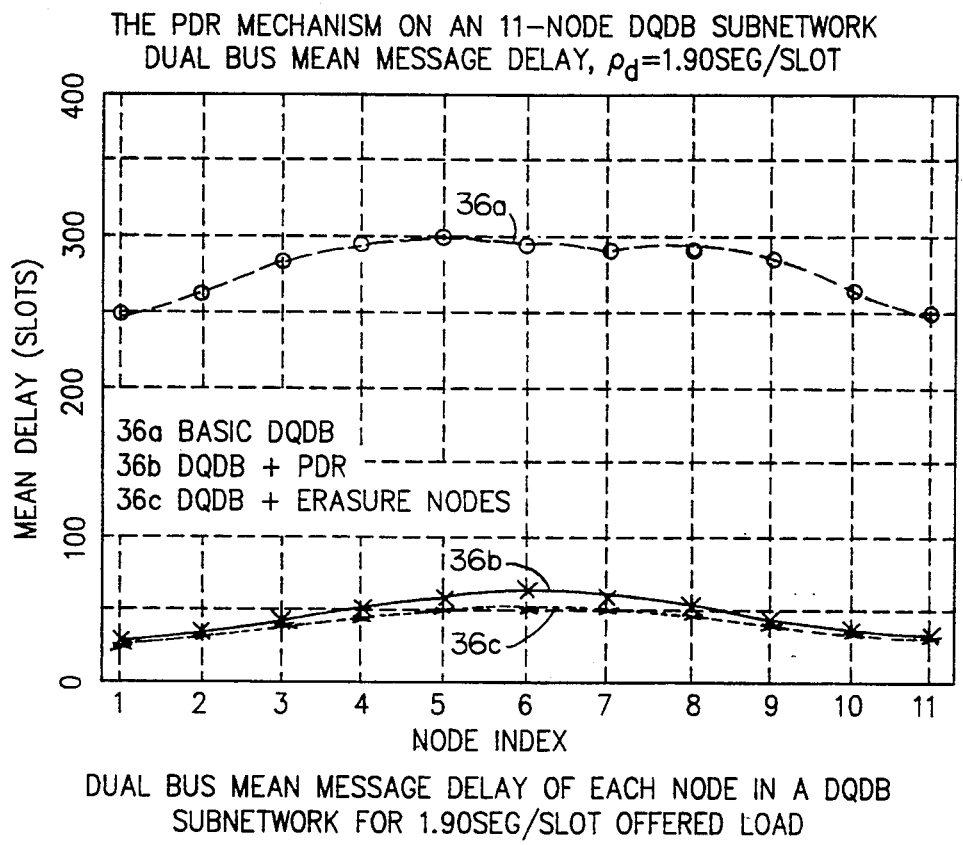

FIG.11

THE PDR MECHANISM ON AN 11-NODE DQDB SUBNETWORK
DUAL BUS MEAN MESSAGE DELAY, $\rho_d$=1.90SEG/SLOT 36a BASIC DQDB
36b DQDB + PDR
36c DQDB + ERASURE NODES DUAL BUS MEAN MESSAGE DELAY OF EACH NODE IN A DQDB
SUBNETWORK FOR 1.90SEG/SLOT OFFERED LOAD

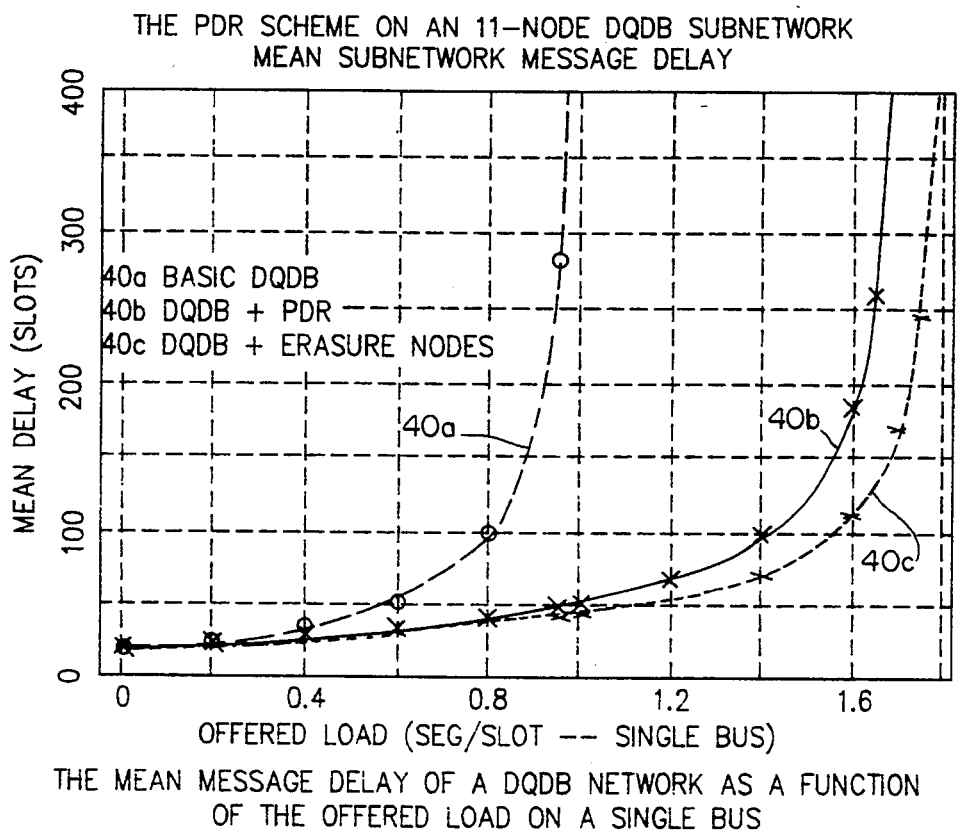

FIG.12

THE PDR SCHEME ON AN 11-NODE DQDB SUBNETWORK
MEAN SUBNETWORK MESSAGE DELAY

40a BASIC DQDB
40b DQDB + PDR
40c DQDB + ERASURE NODES

THE MEAN MESSAGE DELAY OF A DQDB NETWORK AS A FUNCTION
OF THE OFFERED LOAD ON A SINGLE BUS

SCHEME FOR SOURCE ASSISTED PARTIAL DESTINATION RELEASE OF SLOTS IN SLOTTED NETWORKS

BACKGROUND OF THE INVENTION

This invention generally relates to communication systems, and more particularly, to a scheme or protocol for releasing busy slots in a slotted bus network.

Various types of communications networks use fixed slots as basic units for information exchange. Such networks include the distributed-queue dual bus (DQDB) network. In such networks, an empty slot is used by a node to carry information to a specific destination, or to several destinations in case of multicasting. Several protocols have been proposed to control the use of empty slots in a way that attempts to ensure, among other features, fairness among nodes.

Developers of several slot-base protocols attempt to increase the effective throughput of the network by allowing the reuse of slots after their payload is delivered to the intended destination. This desired feature can be accomplished in different ways, depending on the network topology and the acceptable level of complexity of the access control schemes.

The spectrum of slot reuse schemes can be broadly classified into four categories referred to as (i) no slot reuse, (ii) source slot release, (iii) destination slot release, and (iv) specialized erasure nodes.

The no slot reuse scheme is simple but inefficient and is mainly used in open bus topologies. This scheme does not provide for any slot reuse, and a used slot propagates to the end of the network with its busy indicator on or set. The disadvantage of such a simple scheme (which might be better referred to as the absence of any slot reuse scheme) is that some network bandwidth is not used while it could have been used.

In the source slot release scheme, which is mainly used in networks having ring topologies, a node is required to release the slots that it uses after the slots make a full revolution around the network. The principle behind this release scheme is that a released slot carries information that has definitely been received by the intended destination or destinations, since the slot has gone by every node in the network. Therefore, these slots can be safely released and subsequently reused to carry additional segments of information. The disadvantage of such a very conservative release scheme is that some network bandwidth is wasted in carrying slots uselessly all the way from the destination nodes back to the source nodes. Moreover, every node must delay every slot passing the node until the node determines whether it is the source of information carried in that slot, in which case it has to reset the busy indicator of that slot. This delay may be considerable because of the size of the fields that need to be examined.

In the destination slot release scheme, every destination node is allowed to turn off, or reset, the busy indicators of all the slots actually received by that node. This scheme makes the best possible utilization of the network bandwidth; however, this release scheme introduces additional processing delays at every node, similar to the delays involved in the source slot release scheme.

The fourth type of slot reuse schemes, specialized erasure nodes, has been recently proposed to avoid or minimize any delays at regular network nodes; and this is done by using specialized nodes, rather than the regular network nodes, to turn off the busy indicators of previously received slots. To achieve this, a destination node has to indicate that a given slot has been received, and the erasure node then turns off the busy indicator of that given slot. Under this scheme, the delays needed to check each slot to determine whether that slot has been received by its destination node, occur only at the erasure nodes and not at every node in the network. The use of specialized erasure nodes introduces an unwanted fairness problem, though, because the quality of service provided to the two nodes lying on either side of each erasure node differs significantly.

SUMMARY OF THE INVENTION

An object of this invention is to allow a destination node to release slots that it has used without incurring the processing delay that is needed to examine long fields in the headers of slots.

Another object of the present invention is to use a source node to assist the destination node to identify which slots the destination node can release.

A further object of this invention is to use a source node to assist the destination node to identify the slots the latter node can release, without requiring that the source node significantly delay the slots to insert any header information to do this.

These and other objectives are attained in a slotted communications network by using a source node to indicate in every slot whether that slot is going to the same destination node as the immediately preceding slot. This is done by setting a flag, referred to as the continuation flag, in the header of each slot that is going to the same destination node as the immediately preceding slot; and preferably, this continuation flag is the first symbol in the header. Each node needs only to examine the continuation flag of the slot that immediately follows a slot that node has received. If the continuation flag is set in that following slot, then the destination node resets the busy indicator of that following slot to allow its reuse by other nodes, including the destination node itself if the access protocol allows that.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 11 shows the dual bus mean message delay of each node of the network of FIG. 7 when three different slot release schemes are used.

FIG. 12 shows the mean message delay of the network of FIG. 7 as a function of the offered load on a single bus when three different slot release schemes are used.

DETAILED DESCRIPTION OF THE PREFERRED EMBODIMENTS

Figure 1:
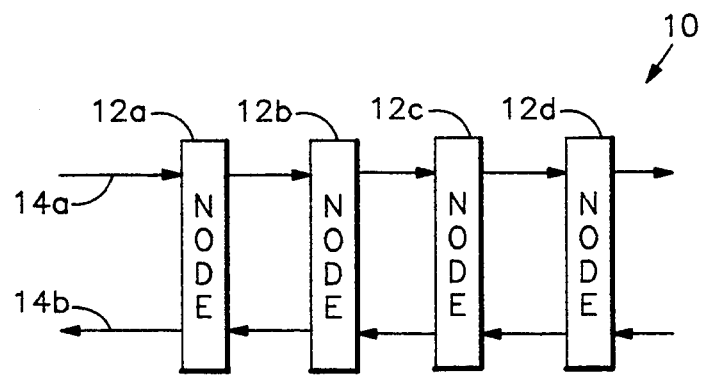
FIG. 1 shows a section of a slotted, dual bus communications network.

FIG. 1 depicts a section of a dual bus network 10, with nodes 12a, 12b, 12c, and 12d and communication media such as buses 14a and 14b passing through those nodes. Network 10 may be a Distributed-Queue Dual Bus (DQDB) network. The standards for a DQDB network are set forth in IEEE Std. 8026-1990, IEEE Standards for Local and Metropolitan Area Networks: Distributed Queue Dual Bus (DQDB) Subnetwork of a Metropolitan Area Network (MAN), 1991. Each node of network 10 is capable of sending data, or traffic, to "downstream" nodes and receiving data, or traffic, from "upstream" nodes. The traffic is in the form of slots of the general type shown in FIG. 2. Each slot contains a header field and a data field; and the current proposal for the header field includes a single busy bit. When a node wants to transmit a data segment on a bus, that node sets a request bit on the opposite bus and waits for an empty slot on the desired bus. The busy bit indicates whether another node (upstream) has already inserted a segment of data into the slot.

The operation for data transmission in both directions is identical. Therefore, for the remainder of this disclosure, operation in only one direction is described. Thus, for example, bus 14a is the data bus and bus 14b is the reservations bus.

Figure 2:
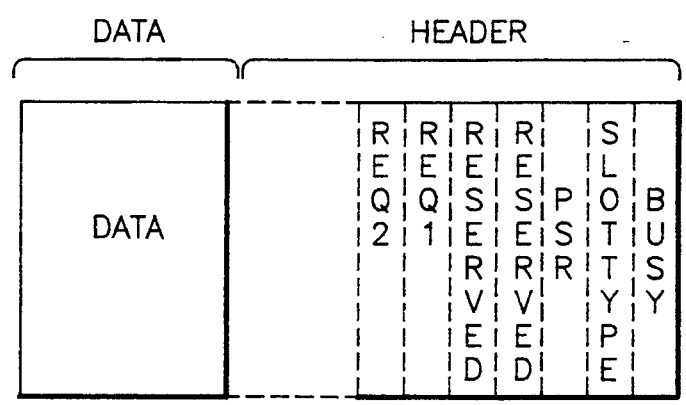
FIG. 2 illustrates one of the time slots appearing in the two buses of the network shown in FIG. 1.

As shown in FIG. 2, the current proposal for the header format also includes two spare bits; and in accordance with the present invention, one of these spare bits is used as a continuation flag. Generally, a source node sets the continuation flag of a given slot if that slot is destined for the same destination node as the immediately preceding slot. With this arrangement, each destination node, after it receives a particular slot that was destined for that node, need only check the continuation flag in the next slot in order to determine if that next slot also is destined for the node.

Figure 3:
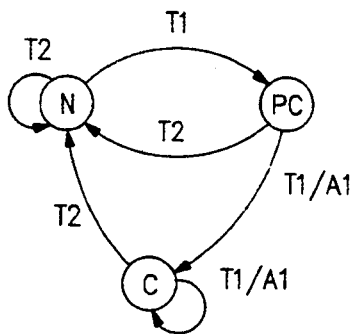
FIG. 3 schematically illustrates two states of each source node of the communications network.

In the operation of network 10, each source node is in one of two states: (i) a normal state, and (ii) a possible continuation (PC) state. These states are schematically illustrated in FIG. 3. In the normal state, a source node handles all the normal functions and operations of a node that operates in a network using the no-slot reuse scheme. When a given node uses a slot to send information, however, that node enters the PC state. If the next slot is either busy or cannot be used by that given node, then the given node returns back to the normal state. Thus, a source node has to refresh its PC state each time a slot passes by it; and if the node uses a slot, the node then goes into, or remains in, the possible continuation state, otherwise the node goes into, or remains in, the normal state.

While in the PC state, if a source node uses the new slot to send information to the same destination node as the immediately preceding slot, then the source node sets the continuation flag of that new slot. In all other cases, the source node leaves the PC state.

Figure 4:
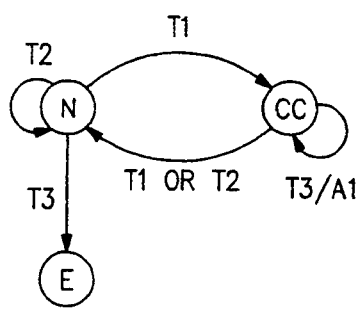
FIG. 4 schematically illustrates two states of each receiving node of the communications network.

Each receiving or destination node can also be in one of two states: (i) a normal state, and (ii) a check continuation (CC) state. These states are schematically illustrated in FIG. 4. A node is in the CC state if, and only if, it was the destination of the last slot that passed by the node; and in all other cases, a receiving node is in the normal state. In the normal state, a receiving node handles all the normal functions and operations of a node that operates in a network using the no slot reuse scheme. While in the CC state, however, the node checks the continuation flag of the received slot; and if that flag is set, the receiving node concludes that the slot is also destined for that node, like the previous slot. Therefore, the node resets both the busy and continuation flags of that slot and receives the content of the slot; and in this case, the receiving node also remains in the CC state. The node processing time required to determine whether the continuation flag is set and, if appropriate, to reset the busy and continuation flags can be extremely small; and, for example, should not exceed a few tens of nanoseconds in high speed communication networks.

While a node is in the CC state, if the continuation flag is not set in the next slot passing the node, then that node returns to the normal state. When in the normal state, a node acts regularly; that is, it checks the header fields that identify the destinations of the slots, and decides accordingly whether the node is the actual destination of the slots. If the node recognizes that it has to receive the examined slot, then the node goes into the CC state and receives the slot. Preferably, this slot is not released, however, because the decision whether to release a slot takes a relatively long time, and an object of the slot release scheme of the present invention is to avoid increasing the latency period of the nodes.

The following examples illustrate the performance of networks that operate with the partial destination release (PDR) scheme of the present invention.

Figure 5:
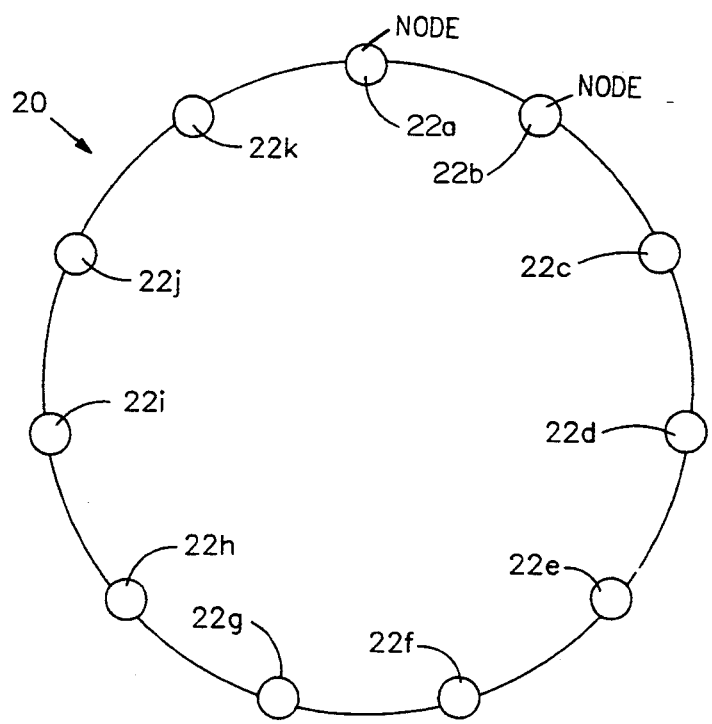
FIG. 5 schematically illustrates an eleven node communications network that may embody the present invention.

FIG. 5 shows an eleven node slotted dual bus network 20. The total length of the network is 50 slots and the nodes 22a–22k are positioned at five-slot intervals. Each slot is, for example, 53 octets long, with the first octet of each slot containing the busy/empty bit as well as the continuation flag bit needed to implement the slot release scheme of this invention. For purposes of this example, each node generates an equal amount of messages that are fragmented into 20 segments, and each message segment requires a single slot for its transmission. In addition, for purposes of this example, each message generated by a node is considered as having an equal probability of being destined for any one of the other nodes and the network is considered as operating at 95% of maximum capacity or load—that is, over a single bus, 0.95 message segments are transmitted per available data slot, and over dual buses, 1.90 message segments are transmitted per available data slot.

This data traffic model result in a graded traffic profile per bus with the heavier loaded nodes being positioned upstream and the lighter loaded nodes being positioned downstream. The message generation processes in the nodes may constitute independent Poisson processes.

Figure 6:
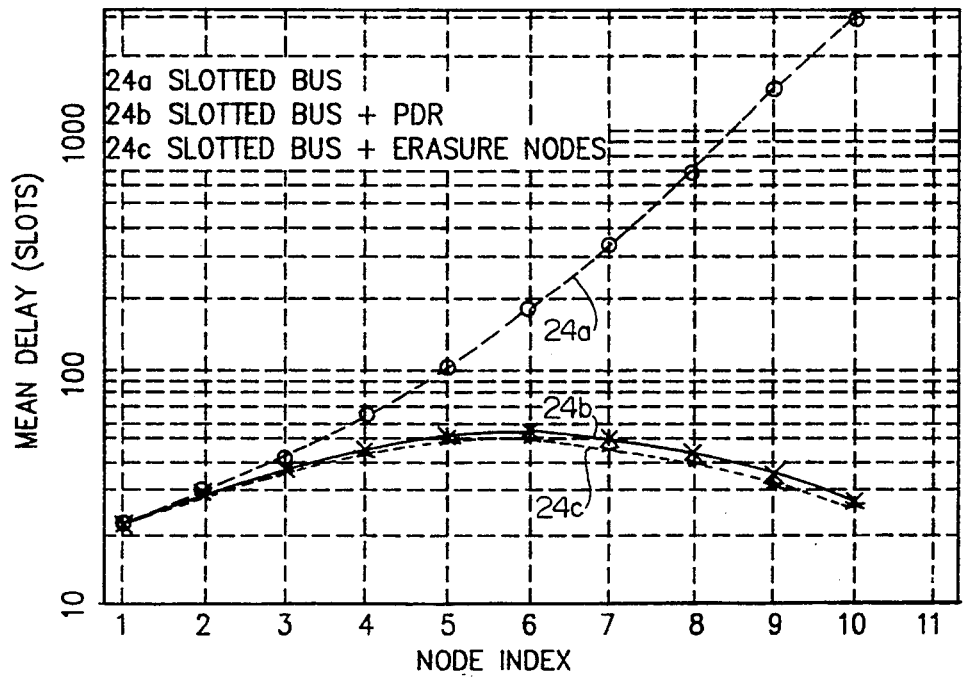
FIG. 6 shows the single bus mean message delay of each node of the network of FIG. 5 when three different slot release schemes are used.
Figure 7:
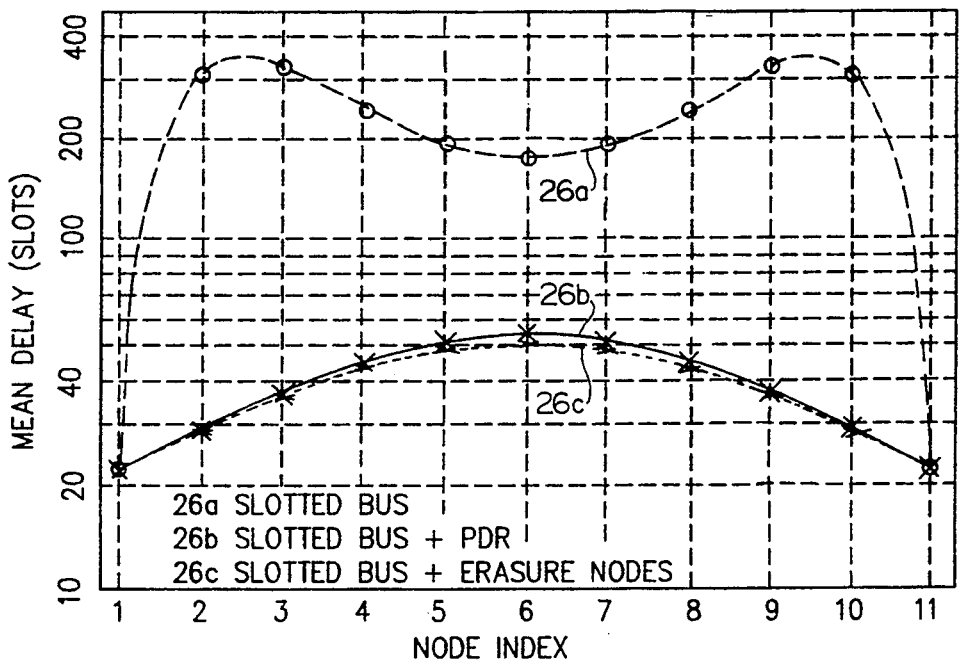
FIG. 7 shows the dual bus mean message delay of each node of the network of FIG. 5 when three different slot release schemes are used.

FIGS. 6 and 7 show the mean message delays (that is, the time elapsed from the moment that a message is generated until it is transmitted in the network) over a single bus and a dual bus network respectively, under the above-described circumstances, for three types of slot release schemes. More specifically, curves 24a, 24b, and 24c of FIG. 6 show the mean message delay of each node in a slotted single bus network, for 0.95 seg/slot offered load, using, respectively, no slot reuse, the partial destination slot release scheme of this invention, and specialized erasure nodes to release slots. FIGS. 26a, 26b, and 26c of FIG. 7 show the mean message delay of each node in a slotted dual bus network, for 1.90 seg/slot offered load, using these same three slot release schemes respectively. A comparison of curves 24a and 24b and a comparison of curves 26a and 26b show the improvement in the performance of the network due to the use of a slot release scheme. In the case of a single bus network not having any slot release scheme, the downstream nodes are all but starved of empty slots. The slot release schemes introduce slots that the downstream nodes can utilize, dramatically improving their delay characteristics.

Curve 24b of FIG. 6 and curve 26b of FIG. 7 show the performance of the single and dual bus networks, respectively, employing the partial destination release scheme of this invention; and curve 24c of FIG. 6 and curve 26c of FIG. 7 show the performance of the network using a total slot release scheme. As these curves show, the PDR scheme of this invention performs very similarly to the ideal total slot release scheme. This, together with the fact that the PDR scheme is much simpler to implement than the total slot release scheme, manifests the advantages of the PDR scheme. Also, as can be seen, the maximum network throughput is strongly dependent on the destination distribution of messages, and this network throughput can range from one (as if no slot reuse whatever is enabled) up to the number of active nodes.

Figure 8:
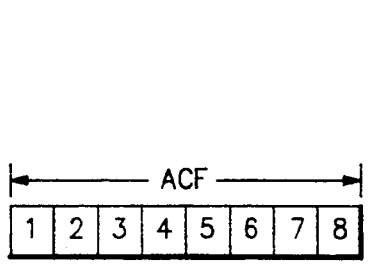
FIG. 8 shows a standard header for slots used in a Distributed-Queue Dual Bus Network.

The slot release scheme of the present invention may also be employed on a subnetwork of the type referred to as a distributed-queue dual-bus (DQDB) network, which is a communications network with a slotted access protocol that has been standardized by the IEEE 802.6 working group. The standard slot header for slots used in this network is shown in FIG. 8. The first bit in the header is used to indicate whether the slot is busy, the second bit identifies the slot type, and the third bit identifies the PSR of the slot. Currently, the fourth and fifth bits in this header are reserved; and the sixth, seventh, and eight bits in the header form the request field.

In accordance with this invention, one of the currently reserved bit locations is used as the continuation flag. The rest of the field need not be changed. Hence, the present invention is fully compatible with this base standard, and nodes using both the basic DQDB protocol and the enhanced version of this invention can interoperate in the same network.

If, as shown in FIG. 8, the fourth bit in the ACF is used as the continuation flag, then the delay in every node that is needed to set or reset that flag will be approximately equal to four bit intervals, which is about 26 nanoseconds at 155 Mbps. For practical reasons, this delay may be made equivalent to the passing time of one full octet. This delay is less than 2% of the fixed latency period, 54 octets, introduced by a slot erasure node.

When the bandwidth balancing mechanism is disabled, the maximum utilization of a network that operates with the DQDB protocol is one. This implies that under full utilization, every slot on the forward bus leaving the most downstream node is busy, while each slot on the reserve bus leaving the most upstream node contains a request. Because of the mandatory presence of requests, any destination release scheme devised for a DQDB subnetwork, including the release scheme of this invention, cannot improve the maximum network throughput unless that destination release scheme incorporates a corresponding request release scheme. Nevertheless, similar to the case of the slotted bus, if simply the PDR scheme is employed, or enabled, on the DQDB network, then the delay characteristics of the downstream nodes along the bus are dramatically improved. The downstream nodes significantly benefit from the increased number of empty slots that they see due to the release of busy slots; and as a result, the downstream nodes see their delays substantially reduced.

In contrast, if no request release scheme is introduced, then the upstream nodes see an excessive number of unnecessary requests that they still have to honor, and hence, upstream nodes see an increase in their delays. An introduction of a request release scheme immediately alleviates the latter problem.

Figure 9:
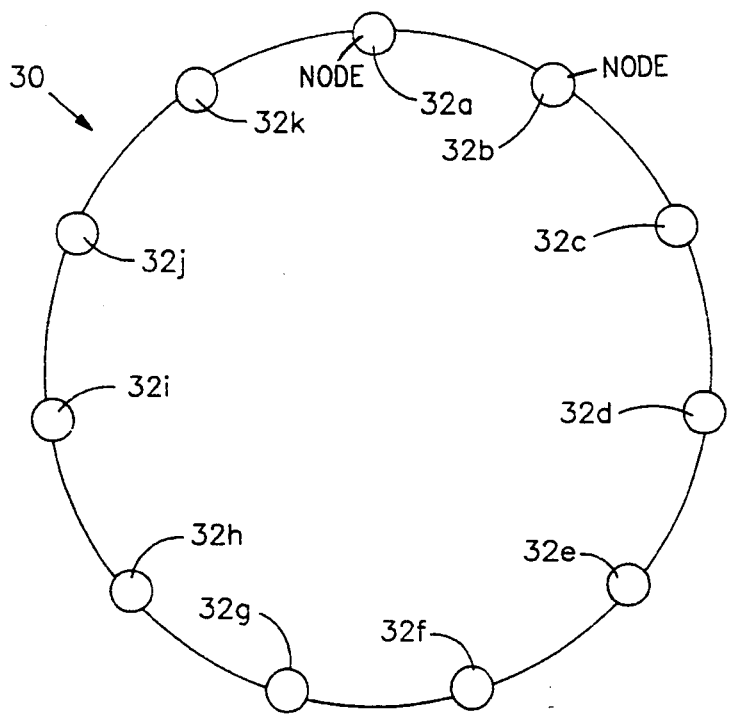
FIG. 9 schematically illustrates an eleven-node Distributed-Queue Dual Bus Network.

FIG. 9 shows a DQDB subnetwork 30 having eleven nodes 32a–32k. For purposes of this example, subnetwork 30 operates under conditions similar to those discussed above in connection with network 20 shown in FIG. 5. In subnetwork 30, a node processing delay of one octet occurs when the PDR scheme is used and a node processing delay of 54 octets occurs when a total slot release scheme is employed. Also, for purposes of this example, it is assumed that a node can immediately utilize a busy or request slot that it has released, and that the bandwidth balancing is disabled.

Figure 10:
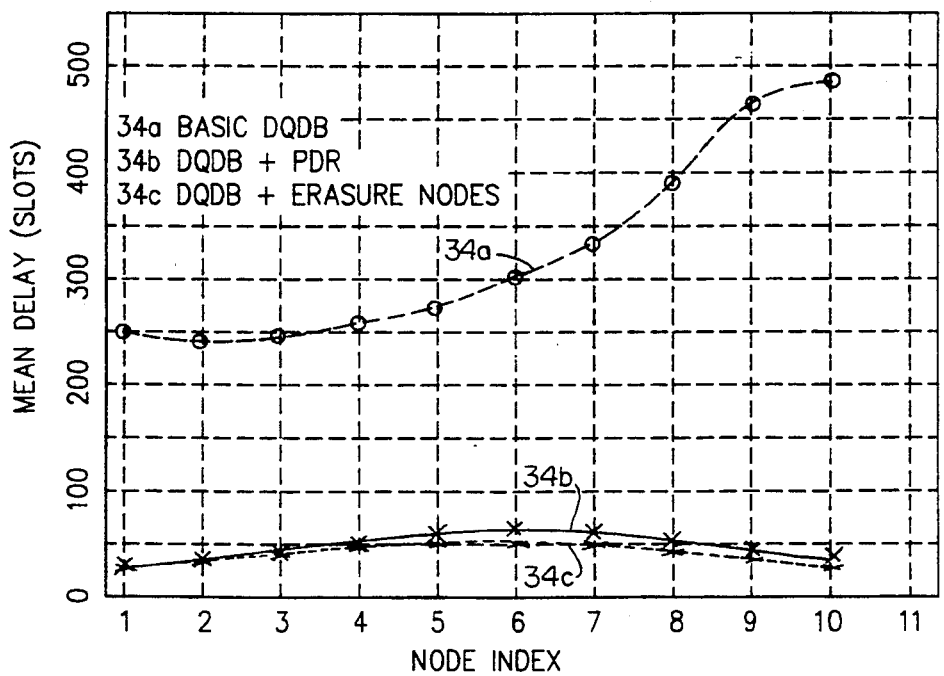
FIG. 10 shows the single bus mean message delay of each node of the network of FIG. 7 when three different slot release schemes are used.

Curves 34a, 34b, and 34c of FIG. 10 illustrate the mean message delay characteristics per node of network 30 as a function of the offered load on a single bus when the network employs, respectively, the basic DQDB subnetwork slot release scheme, the PDR release scheme of this invention, and the total slot release scheme. A comparison of curve 34a with curves 34b and 34c, reveals once again the beneficial effects of a slot release scheme, as it was explained earlier. Once again, it is apparent from FIG. 10 that the PDR scheme, although much simpler, provides performance results similar to those provided by the total slot release scheme.

Curves 36a, 36b, and 36c of FIG. 11 show the mean delay of a message in accessing either one of the buses of network 30. Again when the network employs, respectively, the basic DQDB subnetwork slot release scheme, the PDR scheme of this invention and the total slot release scheme. As can be seen from FIG. 11, the performance of the subnetwork when the PDR scheme is employed is substantially equal to the performance of the subnetwork when the total slot release scheme is used.

FIG. 12 depicts the mean delay of a message generated anywhere in the network 30 (that is, the message delay averaged over all the network nodes) as a function of the offered load on a single bus. In particular, curves 40a, 40b, and 40c of FIG. 12 show this mean delay when network 30 employs the basic DQDB subnetwork slot release scheme, the PDR scheme of this invention, and the total slot release scheme, respectively. FIG. 12 shows that the PDR scheme not only significantly decreases the message delays of the network, but also dramatically increases the network throughput at a traffic load level (approximately 1.72 segments/slot) that is very close to the maximum possible traffic load level (approximately 1.82 segments/slot) under the above-described conditions and when the total slot reuse scheme is employed.

The maximum network throughput depends on the distribution of message destinations and the message lengths, as measured in slots. The maximum network throughput with PDR increases with the number of segments in a message, and this is due to the fact that more contiguous segments may flow from a particular source node to a particular destination node. Hence, with only one slot not released by a destination node, many more slots may be consecutively released by the destination node. The maximum message size allowed in a DQDB network is of the order of 200 segments. Thus, a throughput higher than the above discussed 1.72 segments/slot is possible, however, 1.82 segments/slot is the maximum possible throughput if any slot release scheme is used under the above-described conditions. The absolute maximum network throughput when either the PDR scheme or the total slot reuse scheme is used, ranges from 1 (as if no slot reuse is used) when all nodes transmit to the most downstream node of the network, up to the number of active nodes when each node transmits to the node immediately downstream of it.

In accordance with the present invention, the source node of a slot in a slotted network assists the destination node of that slot to identify quickly that it is the destination of that slot by simply looking at a single bit flag and without having to decode the much longer fields that identify the destination node, such as the address field or the virtual circuit identifier and the message identifier fields. This single flag is used to signal that a particular slot flows between the same pair of source and destination nodes as the immediately preceding slot on the transmission medium.

The destination node can release a used slot without having to examine the long address field of the slot; and instead the node need only examine the continuation bit in the first octet of the slot and can, therefor, release the slot without significant processing delay.

The present invention introduces the concept of partial slot release. In particular, the invention allows for the non-reuse or non-release of the first busy slot in a stream of consecutive busy slots flowing between a given source node and a given destination node. Allowing for the non-reuse or non-release of this first busy slot significantly increases the simplicity of the slot release scheme and substantially reduces the processing delays incurred at the nodes.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new, and desire to secure by Letters Patent is:

1. A method of releasing time slots in a slotted communications network of the type having a multitude of nodes and a communications medium connecting the nodes together, in which data are transmitted in the time slots between the nodes, wherein for each of the time slots, one of the nodes is a source node and at least one of the nodes is a destination node, and wherein the time slots follow one another in sequence and each of the time slots includes a continuation flag and a busy flag, the method comprising:

for each time slot, the source node of the time slot setting the continuation flag and the busy flag of said each time slot each time said each time slot is destined for the same destination node as was an immediately preceding time slot; and for each time slot the destination node of said each time slot resetting the continuation flag of said each time slot, and releasing said each time slot to receive new data, each time (i) the continuation flag of said each time slot is set, and (ii) a time slot immediately preceding said each time slot was destined for said same destination node.

2. A method according to claim 1 wherein each time slot comprises a header field including a plurality of bit locations arranged in sequence, one of said bit locations comprising-the continuation flag of said each time slot, and another of said bit locations comprising the busy flag of said each time slot, and wherein:

the resetting step includes the step of, the destination node of each time slot searching through the header field of the time slot that immediately follows said each time slot, only to the continuation flag of the header field of said immediately following time slot to determine if said immediately following time slot is destined for said destination node.

3. A method according to claim 2, further comprising the step of for each time slot, the destination node of said each time slot also resetting the busy flag of the time slot that immediately follows said each time slot if the continuation flag of said immediately following time slot is set.

4. A method according to claim 1, further comprising the step of each node changing from a normal state to a possible continuation state whenever said each node enters data into one of the time slots for transmission to one of the nodes.

5. In a slotted communications network of the type having a multitude of nodes and a communication medium connecting the nodes together, in which data are transmitted in time slots between the nodes wherein for each of the time slots, one of the nodes is a source node and at least one of the nodes is a destination node, and wherein the time slots follow one another in sequence and each of the time slots includes a continuation flag and a busy flag, the method comprising:

using the source node of each time slot to set a continuation flag in said each time slot to indicate that said each time slot is bound for the same destination node as an immediately preceding time slot, each node, after receiving a time slot destined for said each node, only examining the continuation flag of the next arriving time slot to determine whether said next arriving time slot is also bound for said each node.

6. A method according to claim 5, wherein:

the using step includes the step of, the source node of each time slot also setting a busy flag in said each time slot to indicate that said each time slot is bound for at least one of the other nodes; and further including the step of, each node after receiving one of the time slots destined for said each node, resetting the busy flag in the next one of the time slots arriving at said each node, to indicate that said next arriving time slot is available to receive new data, if the continuation flag of said next arriving time slot is set.

7. A method according to claim 6, wherein each time slot comprises a header field including a plurality of bit locations arranged in sequence, one of the bit locations being the continuation flag of the time slot, and another of the bit locations being the busy flag of the time slot, and further comprising the step of each node, after receiving one of the time slots destined for said each node, examining the header field of the next one of the time slots arriving at said each node only to the continuation flag of said next arriving time slot to determine whether said next arriving time slot is also bound for said each node.

8. A method according to claim 6, further comprising the step of each node changing from a normal state to a possible continuation state whenever said each node enters data into one of the time slots for transmission to one of the nodes.

9. A slotted communication network, comprising:
a multitude of nodes;
a communication medium connecting the nodes together;
each of the nodes including means to transmit data into and to receive data from the communication medium;
wherein data is transmitted in time slots between the nodes, wherein for each of the time slots, one of the nodes is a source node and at least one of the nodes is a destination node, and wherein the time slots follow one another in sequence and each of the time slots includes a continuation subfield; and
each node being adapted to set the continuation subfield of each time slot to a first value each time said each node transmits data into said each time slot and said each time slot is destined for the same node as was the immediately preceding time slot.

10. A communication network according to claim 9, wherein:
each node is adapted to receive data from each of the time slots and to set the continuation subfield of said each of the time slots to a second value if
  i) the continuation subfield of said each of the time slots is set to the first value, and
  ii) the time slot immediately preceding said each of the time slots was destined for said each node.

11. A communication network according to claim 10, wherein:
each time slot also includes a busy subfield having first and second values, said first value indicating that the time slot is destined for at least one of the nodes, said second value indicating that the time slot is not destined for any of the nodes;
each node sets the busy subfield of each time slot to the second value if
  i) the continuation subfield of said each of the time slots is set to the first value, and
  ii) the time slot immediately preceding said each of the time slots was destined for said each node.

12. A communications network according to claim 9, wherein:
  i) a normal transmit state, and
  ii) a possible continuation state; and
each node changes from the normal state to the possible continuation state when the node enters data into one of the time slots for transmission to one of the nodes.

13. A communication network according to claim 12, wherein:
each node further has
  iii) a normal receive state, and
  iv) a check continuation state;
each node changes from the normal receive state to the check continuation state whenever the node receives data from one of the time slots; and
when each node is in the check continuation state and another one of the time slots passes by said each node, said each node checks the continuation subfield of said another one of the time slots, and
  a) if said checked continuation subfield is set to the first value, then said each node receives data from said another one of the time slots, and
  b) if said checked continuation subfield is not set to the first value, then said each node does not receive data from said another one of the time slots.

* * * * *